US009116433B2

(12) United States Patent
Vannuffel et al.

(10) Patent No.: US 9,116,433 B2
(45) Date of Patent: Aug. 25, 2015

(54) DOUBLE-MASK PHOTOLITHOGRAPHY METHOD MINIMIZING THE IMPACT OF SUBSTRATE DEFECTS

(71) Applicant: COMMISSARIAT A L'ENERGIE ATOMIQUE ET AUX ENERGIES ALTERNATIVES, Paris (FR)

(72) Inventors: Cyril Vannuffel, Saint-Martin-le-Vinoux (FR); Jean-Louis Imbert, Seyssinet (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/189,835

(22) Filed: Feb. 25, 2014

(65) Prior Publication Data
US 2014/0242522 A1    Aug. 28, 2014

(30) Foreign Application Priority Data
Feb. 28, 2013   (FR) ..................................... 13 51759

(51) Int. Cl.
G06F 17/50     (2006.01)
G03F 1/00      (2012.01)
G03F 7/20      (2006.01)
G03F 1/72      (2012.01)
G03F 1/84      (2012.01)

(52) U.S. Cl.
CPC ................ *G03F 7/2026* (2013.01); *G03F 1/72* (2013.01); *G03F 1/84* (2013.01); *G03F 7/7065* (2013.01); *G03F 7/70433* (2013.01); *G03F 7/70466* (2013.01); *G06F 2217/12* (2013.01)

(58) Field of Classification Search
CPC ........... G03F 1/22; G03F 7/20; G03F 7/2026; G03F 7/70466; G06F 2217/12; G06F 7/7065
USPC ................................ 716/52, 53, 54, 55; 430/5
See application file for complete search history.

(56) References Cited

U.S. PATENT DOCUMENTS

| 5,795,685 | A   |   | 8/1998 | Liebmann et al. |
| 6,593,036 | B1  | * | 7/2003 | Robic et al. .................. 430/5 |
| 6,686,099 | B2  | * | 2/2004 | Tanaka et al. ................ 430/5 |
| 6,765,673 | B1  | * | 7/2004 | Higashikawa ............. 356/399 |

(Continued)

OTHER PUBLICATIONS

Abde Ali Kagalwalla, et al., Design-Aware Defect-Avoidance Floorplanning of EUV Masks, IEEE Transactions on Semiconductors Manufacturing, Feb. 2013, pp. 111-124, vol. 26, No. 1, IEEE Service Center, Piscataway, NJ, USA, XP011491658.

*Primary Examiner* — Helen Rossoshek
(74) *Attorney, Agent, or Firm* — Baker & Hostetler LLP

(57) ABSTRACT

In the field of photolithography and, notably, photolithography in the extreme ultraviolet, a photolithography method is provided in which a first mask blank is produced that can have defects, an individual mapping of the positions of the defects of this mask blank is established using an inspection machine, and, for each defect, an exclusion zone is defined around the defect. Then, two complementary masks are produced, one with the first mask blank and with the desired design pattern, except in the exclusion zones, the latter being black, the other with a second mask blank and with the desired design pattern parts in the exclusion zones, all the rest of the second mask being black. The exposure of the surface to be processed by photolithography is done in two successive steps using the two complementary masks.

19 Claims, 4 Drawing Sheets

(56) References Cited

U.S. PATENT DOCUMENTS

| | | | | |
|---|---|---|---|---|
| 7,226,705 | B2 * | 6/2007 | Hata | 430/5 |
| 7,303,842 | B2 * | 12/2007 | Watson et al. | 430/5 |
| 7,923,177 | B2 * | 4/2011 | Charpin-Nicolle | 430/5 |
| 7,927,765 | B2 * | 4/2011 | Quesnel | 430/5 |
| 7,927,766 | B2 * | 4/2011 | Barrett et al. | 430/5 |
| 8,039,178 | B2 * | 10/2011 | Tanabe et al. | 430/5 |
| 8,206,889 | B2 * | 6/2012 | Tanaka | 430/270.1 |
| 8,458,623 | B1 * | 6/2013 | Wagner | 716/51 |
| 8,609,304 | B2 * | 12/2013 | Tanabe et al. | 430/5 |
| 8,637,213 | B2 * | 1/2014 | Hashimoto et al. | 430/5 |
| 8,711,346 | B2 * | 4/2014 | Stokowski | 356/237.2 |
| 8,726,202 | B2 * | 5/2014 | Wagner | 716/54 |
| 8,785,082 | B2 * | 7/2014 | Xiong et al. | 430/5 |
| 8,802,334 | B2 * | 8/2014 | Yamada et al. | 430/5 |
| 2006/0093924 | A1 | 5/2006 | Adissson et al. | |
| 2007/0158636 | A1 | 7/2007 | Tezuka | |
| 2009/0297988 | A1 * | 12/2009 | Tanaka | 430/319 |
| 2012/0238096 | A1 * | 9/2012 | Xiong et al. | 438/694 |
| 2012/0258388 | A1 * | 10/2012 | Yamada et al. | 430/5 |
| 2012/0322000 | A1 * | 12/2012 | Uno et al. | 430/5 |
| 2013/0017475 | A1 * | 1/2013 | Terasawa et al. | 430/5 |
| 2013/0198697 | A1 | 8/2013 | Hotzel | |
| 2013/0273463 | A1 * | 10/2013 | Wagner | 430/5 |
| 2014/0106263 | A1 * | 4/2014 | Utzny | 430/5 |

\* cited by examiner

DOUBLE-MASK PHOTOLITHOGRAPHY METHOD MINIMIZING THE IMPACT OF SUBSTRATE DEFECTS

CROSS-REFERENCE TO RELATED APPLICATION

This application claims priority to foreign French patent application No. FR 1351759, filed on Feb. 28, 2013, the disclosure of which is incorporated by reference in its entirety.

FIELD OF THE INVENTION

The invention relates to the fabrication of photolithography masks. Photolithography in the extreme ultraviolet (EUV) is more particularly involved. The wavelengths considered are less than 20 nanometres and are typically 13.5 nm or 6.8 nm. The use of these wavelengths is intended to produce patterns of smaller dimensions than those made possible by photolithography in visible light or in deep ultraviolet (DUV), but the invention applies to any wavelength.

BACKGROUND

The particular feature of the EUV masks is that they are used in reflection mode and not in transmission mode. They are reflective for the useful EUV wavelength, that is to say the one which will be used for the photolithography operations with this mask. The binary EUV masks also relate to a pattern of zones that are absorbent for the useful EUV wavelength. EUV masks with phase offset relate to a pattern of phase-shifting zones. To simplify the explanations, it is hereinafter considered that the masks are binary masks, although the invention applies also to masks with phase offset.

In use, the mask is lit by an EUV light and reflects this radiation, except in the absorbent zones where the light is absorbed and cannot be returned. The EUV lighting has a well determined wavelength and is spatially modulated by this pattern and is projected by a focusing optic with mirrors onto a surface to be exposed. The surface to be exposed is a layer of EUV-sensitive resin, deposited on a planar substrate. This layer covers the layers that are to be etched or treated (for example implanted) after the exposure of the resin to the EUV radiation. The subsequent chemical development of the resin leaves a structure in which the layers to be etched or to be implanted are covered with a resin pattern which protects certain zones and reveals other zones.

The projection optic reduces the image and makes it possible to define, in the resin, smaller patterns than those which are etched on the mask. The reduction ratio is generally 4. The mask is generally fabricated from an electron beam writing method.

Typically, a reflection mode mask of binary mask type consists of a planar substrate with low expansion coefficient, covered by a reflecting structure; the reflecting structure is, more often than not, a Bragg mirror, that is to say a structure with multiple transparent layers of different refractive indices. The thicknesses of these layers are computed as a function of the indices, of the wavelength, and of the angle of incidence of the EUV beam, so that the different interfaces, partially reflecting, return lightwaves in phase with one another. The mirror is covered by an absorbent layer etched according to the desired masking pattern, so that the mask comprises reflecting zones (the mirror not covered by absorbent) and absorbent zones (the mirror covered by absorbent). As an example, for a wavelength of 13.5 nm and an angle of incidence of 6 degrees, some forty or so layers of silicon 41.5 angstroms thick (1 angstrom=0.1 nm) will be used, alternated with some forty or so layers of molybdenum 28 angstroms thick. The absorbent zones can be made of chrome (among others) deposited on the mirror; for example, a 600 angstrom layer of chrome placed on the mirror above reflects no more than 1% of the incident light.

The substrate bearing, on its entire surface, a multilayer mirror and a uniform (therefore not yet etched) absorbent layer is called "mask blank". The mask blank is etched according to a desired pattern to form an EUV photolithography mask. The small size of the masking patterns to be produced by the EUV photolithography means that defects of the mask blank can result in defects that are damaging to the photolithographed structure. Small defects of a few tens of nanometres in dimension on the mask can be translated into undesirable patterns that can culminate in unusable structures.

The defects of the mask blank can originate from defects on the surface of the mask blank, or even from defects introduced during the formation of the multiple layers of the Bragg mirror, or finally from the surface defects of the underlying substrate itself, such as scratches, holes, bosses, defects which are propagated in the multilayer structure and are like the mirror defects. The defects are defects of amplitude (absorbent zones which ought not to be absorbent, or vice versa), or defects of optical phase (introduction of an unwanted phase shift when the photolithography light penetrates into the layers of the mask, locally damaging the reflection coefficient).

To give an order of magnitude one objective is to produce a mask that has a number of defects having a size of 60 nanometre or greater that is less than 0.01 defect per $cm^2$. However, the existing technologies do not as yet make this possible.

It has already been proposed to correct the defects as follows: an individual mapping of the defects of each mask blank that is to be used to fabricate the series of masks necessary to the production of a structure (for example a semiconductor wafer bearing multiple microelectronic circuits) is produced. A number of masks are required, corresponding to the different levels of etching or implantations to be produced on the structure. The defects of a series of mask blanks are detected by using market-standard equipment, the position and the size of the defects on each mask blank are noted.

Software determines which mask blanks are usable for the different masks, on the basis of the implantation or "layout" diagrams of the different levels of the circuit to be produced, by providing small X or Y axis offsets or small rotations of the masks so that any defects of the mask blanks are moved outside the designs of the structure (at least outside the most critical zones of the designs).

In the case where the number of defects per mask remains high, it is difficult by this method to find a solution which culminates in them all being placed in an absorbent zone, because there is a low probability of the different defects of a mask all being able to be located in non-critical places when there are only two degrees of freedom in X, Y translation in the plane of the mask and one degree of freedom in rotation in this plane.

SUMMARY OF THE INVENTION

To better avoid the consequence of these defects, the invention proposes a photolithography method, characterized in that it comprises the following steps, for a given photolithography operation on a surface to be exposed according to a desired design pattern: a first mask blank is produced that may have defects, an individual mapping of the positions of the defects of the first mask blank is established using an inspection machine; for each defect, an exclusion zone is defined around the defect, and, depending on the desired design pattern and according to design rules, a first mask design is produced on the first mask blank, the first design comprising the desired design pattern, except in the exclusion zones, the latter being black, and a second mask design is produced on a second mask blank or on the first mask blank, the second mask design comprising a complementary design pattern comprising: in zones associated with the exclusion zones, portions of the desired design pattern, the rest of the second mask design being black; finally, on the surface to be exposed, a photolithography step is performed with the first mask design and a photolithography step is performed with the second mask design, by superposing, on the surface to be exposed, the exclusion zones formed in the first design and the associated zones formed in the second design.

Consequently, instead of using one mask for each photolithography operation, two complementary masks are used (whether they be on one and the same mask blank for design patterns that are not too big or on two different mask blanks for larger design patterns) and the surface to be treated is exposed twice in succession: firstly with one of the masks (or one of the mask designs) then with the other. The masks or mask designs are complementary inasmuch as one exposes the part of surface which is not exposed by the other, without overlap or with only a very small overlap making it possible to ensure that there is no omission in the exposure. One of the masks (or one of the mask designs) ensures the exposure according to the desired pattern, everywhere except in the exclusion zones defined on the basis of the defects inherent to this mask, that is to say the defects of the mask blank which was used to make this first mask; the other mask (or the other mask design) ensures the exposure according to the desired pattern, only in the exclusion zones defined by the defects of the first mask blank.

Preferably, if there are two mask blanks, a mapping of the defects of the second mask blank is also performed, and a check is carried out to ensure that the defects of the second mask blank are not located in an exclusion zone of the first mask blank.

If the processing of a surface requires N photolithography operations, it is possible to do the same thing for each of the N operations, that is to say produce 2N complementary masks where only N of them would normally be used.

The partition between the two zones is executed by mask design processing software. The software contains a file describing the desired design pattern; the position of each of the defects of the first mask blank is introduced into the software; the software computes the exclusion zones around each defect and it establishes a first design file corresponding to the first mask (or to the first mask design if only a single mask blank is used) and a second design file corresponding to the second mask (or to the second mask design); the establishing of the two complementary files takes into account design rules, such as the establishment of an exclusion zone of variable size dependent on the size of the defect observed; or else on the basis of design rules linked to the actual design to be produced; for example, it demands that a partition not be made which would intersect an active zone such as the gate or the channel of a transistor, or the source or the drain.

BRIEF DESCRIPTION OF THE DRAWINGS

Other features and advantages of the invention will become apparent on reading the following detailed description, which is given with reference to the appended drawings in which.

DETAILED DESCRIPTION

Figure 1:
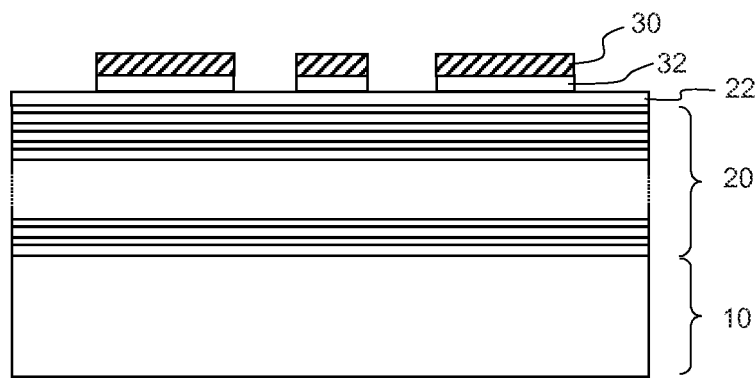
FIG. 1 represents a binary EUV mask structure bearing a pattern of absorbent zones.

FIG. 1 reviews the general structure of a reflection mode extreme ultraviolet photolithography binary mask.

The mask comprises a substrate 10 with low thermal expansion coefficient. It is uniformly covered by a stack 20 of thin layers forming a Bragg mirror at the EUV wavelength at which the mask is used and for the angle of incidence (generally approximately 6°) of the EUV light which will illuminate it. The stack is, more often than not, an alternation of layers of silicon and of molybdenum. The thickness of the layers of silicon and the thickness of the layers of molybdenum are chosen, given the respective refractive indices of silicon and of molybdenum, to establish constructive interferences of the light reflected by each interface between two layers. The stack behaves like a mirror with strong reflection coefficient for the incident EUV light. The alternate layers can be protected by an encapsulation layer 22.

The stack 20 is covered by a layer 30, absorbent to the EUV light, locally etched to define a desired photolithography pattern. The absorbent layer can be made with chrome. A buffer layer 32 which can be of silicon oxide can be provided between the stack 20 and the absorbent layer 30. The buffer layer serves notably as etch stop layer to make it possible to etch the desired pattern in the layer 30 without damaging the surface of the Bragg mirror.

In operation, the mask receives light in the extreme ultraviolet, notably with 13.5 nm wavelength, focused by an optical system generally operating in reflection mode. The exposed zones of the mirror return the light to a projection optic which projects it onto a planar structure bearing a layer to be photolithographed. The mirror zones covered by the absorbent layer do not return any light. The projection optic generally projects an image that is reduced in a ratio of four.

Figure 2:
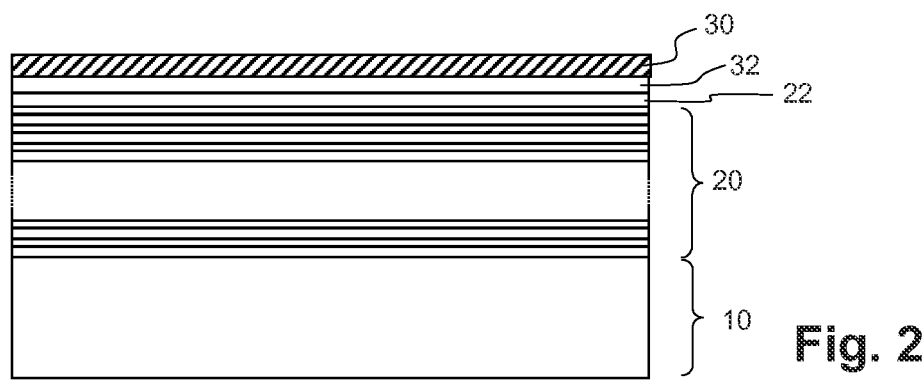
FIG. 2 shows a mask blank in vertical cross section.

Before etching of the photolithography pattern, the assembly of the substrate 10, of the mirror 20, of the buffer layer 32, and of the uniformly deposited absorbent layer is called mask blank. A mask blank is represented in FIG. 2. If the surface of the mask blank comprises defects, these defects disrupt the quality of the final mask. The defects can be on the surface (for example a hole in the uniform layer 30). Defects in depth, in the stack 20 or under the stack 20 or on the surface of the substrate, are translated into defects of phase and can also affect the quality of the mask. The defects are not reparable, or are difficult to repair, once the mask is produced.

These days, it is considered that defects of more than 60 nanometres in width are prohibitive and that a mask should not have a level of defects of this dimension greater than 0.01 per $cm^2$.

To produce a complete structure, for example a microelectronics integrated circuit comprising semiconductive, conductive or insulating layers, etched according to respective patterns, and comprising semiconductive zones that are doped according to the respective implantation patterns, a set of N masks is needed (N>1). The patterns projected onto the structure by each of the N masks are superposed very accurately in successive photolithography steps, to culminate in the construction of the final structure. The set of masks can comprise, by way of example, from 8 to 15 masks for the critical levels; the other levels will be produced, for example, by lithography in the deep ultraviolet (DUV), essentially for economic reasons.

To avoid producing defective masks, the surface of the mask blanks was generally inspected before etching them and the mask blanks with too many defects were eliminated.

According to the invention, this inspection is still carried out, but the mask blanks with defects are not eliminated. A mapping of the defects of the mask blank is performed, that is to say, an inspection machine is used to accurately determine the exact position of each of the defects with a dimension greater than a given value (for example 30 nanometres, but a lower value could be used for greater safety). The position of the defects is identified by abscissa and by ordinate relative to a mask blank reference, for example in relation to the edges of a rectangular mask or to a reference mark formed on the mask.

Figure 3:
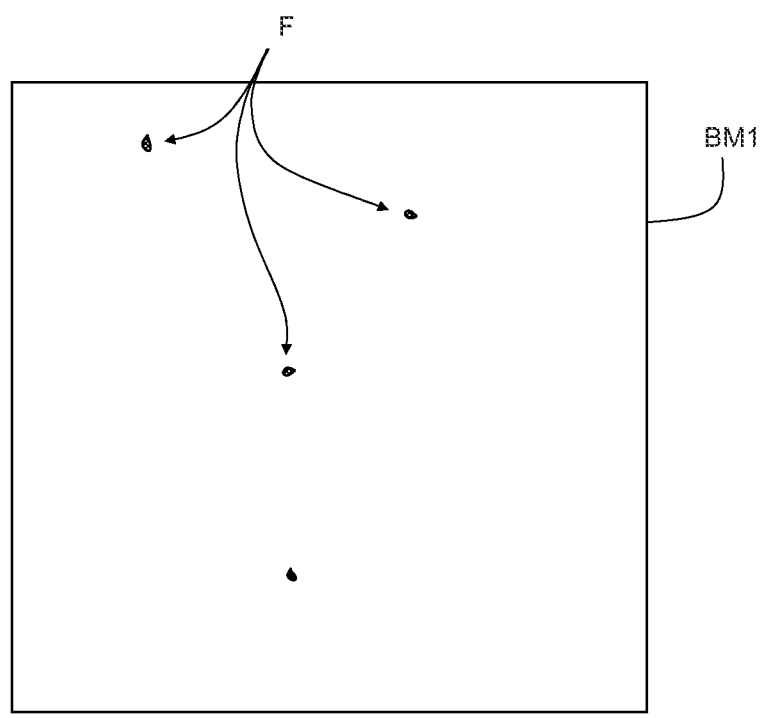
FIG. 3 shows a plan view of a mask blank comprising a few defects.

FIG. 3 represents a plan view of a mask blank BM1 with a few defects F; the positions of these defects in the reference frame are accurately denoted and introduced into design computation software which also contains the description elements of the design that is to be produced in a photolithography operation on a sensitive surface to be exposed.

In the prior art, the software creates a single mask design which will be used in the photolithography operation. The design of the mask is the complete design to be formed on the sensitive surface. It has to be specified here that there can be differences between the design to be produced and the design of the mask which is used to form this design, for various technological reasons. Among these reasons there is the need to introduce optical proximity correction patterns (OPC patterns) into the design of the mask. It will be recalled that the OPC patterns are mask design modifications intended to compensate for the exposure defects due to the edge effects at the limits, the corners, etc., of the plots of the design. To simplify the following explanations, it is considered here that the design DE of the mask is overall the same as the design to be produced. This mask design is contained in a computer file which is used to produce the mask from the mask blank; this file controls, for example, an electron beam writing machine.

In the present invention, for each observed defect F, an exclusion zone ZE of dimension sufficient to encompass all of the defect is defined in the reference frame.

Figure 4:
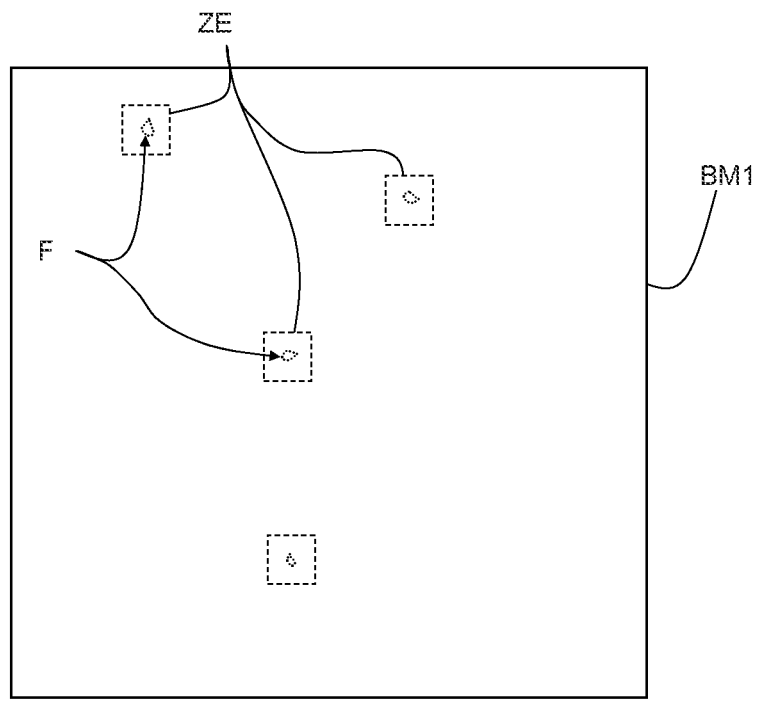
FIG. 4 shows the plot of exclusion zones around each of the defects observed in the mask blank.

FIG. 4 represents the mask blank BM1 with its defects, each surrounded by a respective exclusion zone ZE. For the legibility of the design, the exclusion zones are represented with dimensions much greater than those that they have in reality. In practice, the defects are very small (a few hundred nanometres at most) and the exclusion zones can be squares or rectangles having sides of a few micrometres.

These exclusion zones will be used to process the file of the mask design to produce two complementary files taking into account the exclusion zones.

These complementary files will be used to produce two complementary mask designs that will be able to be produced on two separate mask blanks or, as will be seen later, on one and the same mask blank when the mask blank is large enough to contain at least two complete patterns of the design to be produced.

It is assumed first of all that two mask blanks are used to produce two complementary mask designs.

Figure 5:
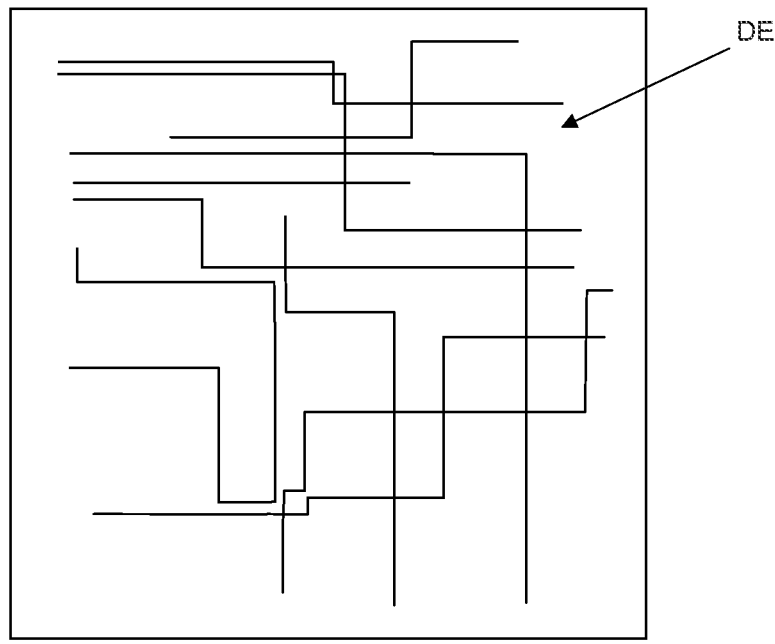
FIG. 5 symbolically represents a mask design to be reproduced for a photolithography operation on a surface to be treated.

FIG. 5 symbolically represents a mask design pattern DE to be produced on the sensitive surface of a silicon wafer. It is this design, or more specifically descriptors of this design, which are contained in the initial file.

From this file and from the coordinates of the defects of the mask blank BM1, the design computation software creates two complementary mask designs M1 and M2. The first mask design M1 is made on a mask blank BM1. The second is made on another mask blank BM2. Preferably, an inspection of the second mask is performed to check that the second mask blank does not have defects in the same places as the first. It would be possible if need be to consider not checking the second mask blank because the probability of there being defects at the same places as on the first is low, but it is nevertheless better to make this check and to choose another mask blank as the second mask blank if defects are found placed at the same places in the two mask blanks.

The two files describing the masks M1 and M2 are established by taking into account design rules, and in particular rules making it possible to plot the limits of the exclusion zones around each defect.

The first file contains a main mask design M1 which is the desired design pattern DE from which the elements placed in the exclusion zones ZE have been removed; the design becomes a design DEp which is the desired pattern but with missing parts replaced by black zones; a "black zone" should be understood to be a zone which will not participate in the exposure of the surface to be treated; in a binary mask, these are the absorbent zones of the mask.

The second file contains a mask design M2 which is essentially a black zone, except in zones ZEa which are identical in dimensions, and in position in the design, to the exclusion zones ZE; these zones will be called ZEa: zones associated with the exclusion zones. The second file represents a mask design M2 consisting of the missing parts DEz of the design DE, and these missing parts are situated in the associated zones ZEa; all the rest of the file is black.

Figure 6:
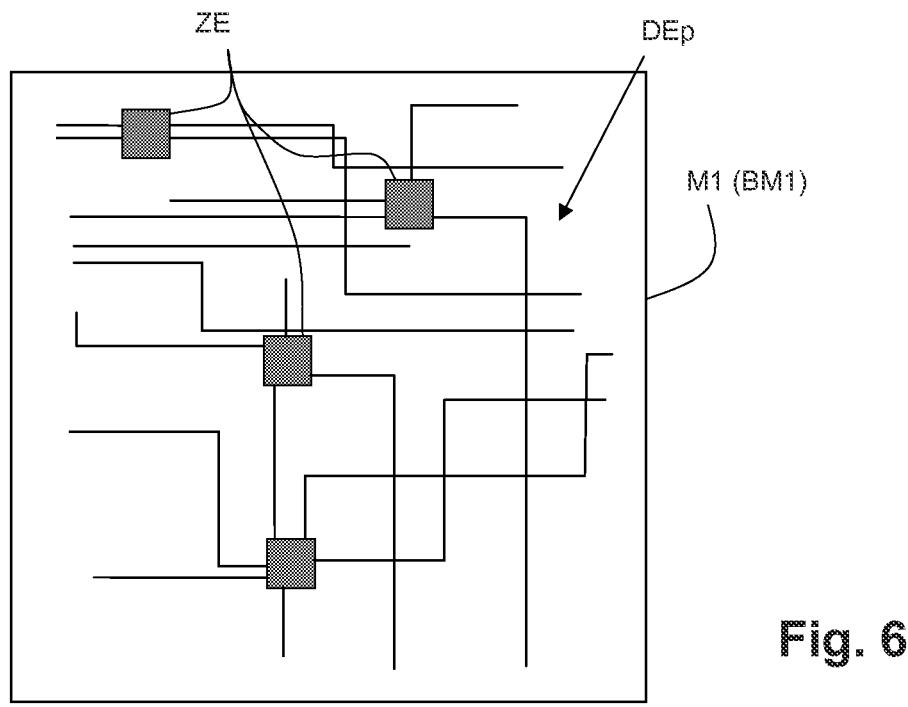
FIG. 6 represents a first mask, produced from the mask blank of FIG. 3, in which the exclusion zones are black and do not therefore participate in the exposure of the surface to be treated, the rest of the mask comprising the mask design to be produced.
Figure 7:
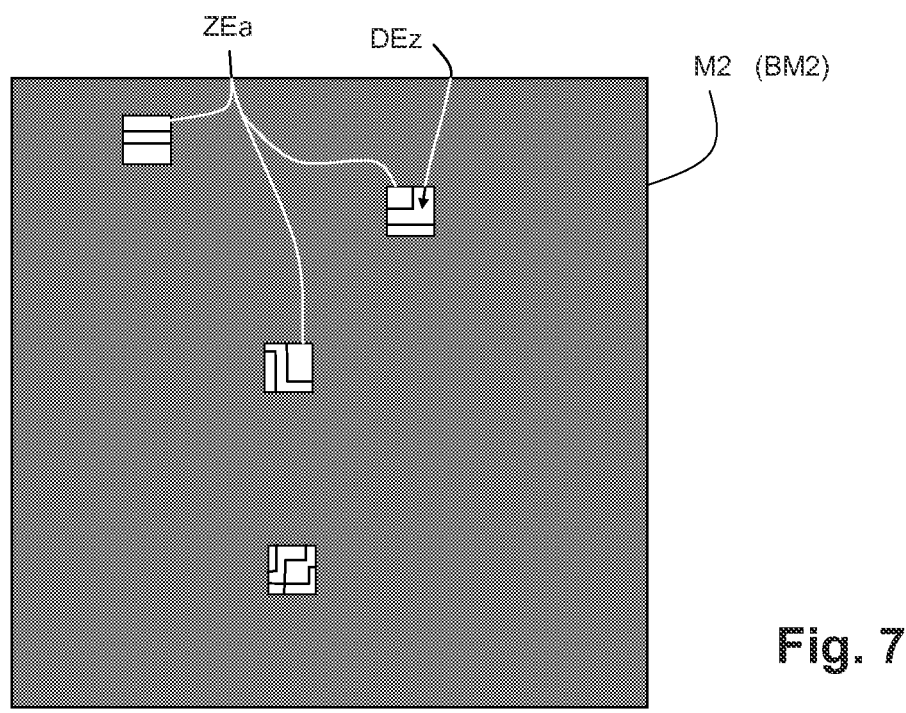
FIG. 7 represents a second mask to be used in one and the same photolithography operation, a mask in which only the exclusion zones comprise a design pattern, the rest of the mask being black and not participating in the exposure of the surface to be treated.

The mask M1 produced from the first file and from the first mask blank BM1 is represented in FIG. 6; it comprises the main design DEp but no design in the black exclusion zones ZE. The mask M2 produced from the second file and from the second mask blank BM2 is represented in FIG. 7; it comprises a complementary design DEz distributed only in the exclusion zones; all the rest is black.

During the photolithography operation intended to expose the surface to be treated in order to form the design DE thereon, this surface is exposed in succession with the complementary masks M1 and M2 (the order is immaterial) by taking care to use the same reference frame to align the surface to be treated with each of the masks. The exclusion zones belonging to the mask M1 and the zones associated with the exclusion zones, belonging to the mask M2, are situated at the same positions in the two masks; their projections are superimposed on the surface to be exposed.

It may be advantageous to securely attach the two masks M1 and M2 to one and the same support to facilitate this alignment. An exposure machine can be used which possesses a magazine capable of receiving a double mask M1+M2.

If the alignment machine comprises a double plate to simultaneously receive two silicon wafers to be treated, it is possible, for example, to proceed as follows: while the first wafer is exposed with the mask M1 the second wafer is pre-aligned. The second wafer is then exposed with the mask M1. Then, the mask M2 is put in place, the wafer M1 is first exposed followed by the wafer M2. The series of operations is then recommenced with a new set of two wafers.

As the partitioning of the design DE has two distinct files DEp and DEz, several types of design rules can be used:
  use of exclusion zones having a fixed dimension, for example 2 micrometres×2 micrometres; this dimension depends notably on the accuracy of the defect mapping machine, an accuracy which is typically of the order of +/−1 micrometre;
  or use of larger exclusion zones if the dimensions of the defect are greater and of smaller exclusion zones for smaller defects;
  use of a single zone for two defects close to one another;
  use of design rules that take into account the actual design DE to be produced; in this case, exclusion zone limits will preferably be sought that intersect the fewest possible design lines, limits which pass between two design lines rather than over one line, limits which intersect certain patterns but not others, and so on. For example, it is possible to prohibit intersecting the design of a transistor gate or a source or a drain, but allowing the design of a conductive connection to be cut.

The exclusion zones can have any form. Nevertheless, it may be preferable to use exclusion zones that are square, rectangular, or more generally polygonal (depending on the main directions of the lines of the design) to simplify the program for computing the design files DEp and DEz from the design file DE.

In the case of binary masks or of masks with phase offset, the black zones correspond to the absorbent zones of the mask.

In the case where the design of the mask includes optical proximity correction patterns (OPC patterns), it may be desirable to adapt these patterns on the two mask designs to the place of the limits of the exclusion zones to take account of the fact that the design will be exposed in two steps and that the exposure at the place of the limits will be affected. The fact of providing a two-stage exposure creates line ends where there should not be any, therefore an additional edge effect at the place of the limit of the exclusion zones; it is possible to take this into account to modify the design at this place to compensate this effect as is done for the rest of the design. This modification can be made in the vicinity of the limits of the exclusion zones and in the vicinity of the limits of the associated zones.

In the case of FIGS. 6 and 7, it is considered that the design pattern to be produced DE occupies almost all of the surface of the mask. However, if the size of the mask is sufficient to contain two instances of the design pattern DE to be produced, the two complementary mask designs M1 and M2 can be juxtaposed on a single mask blank BM1.

Figure 8:
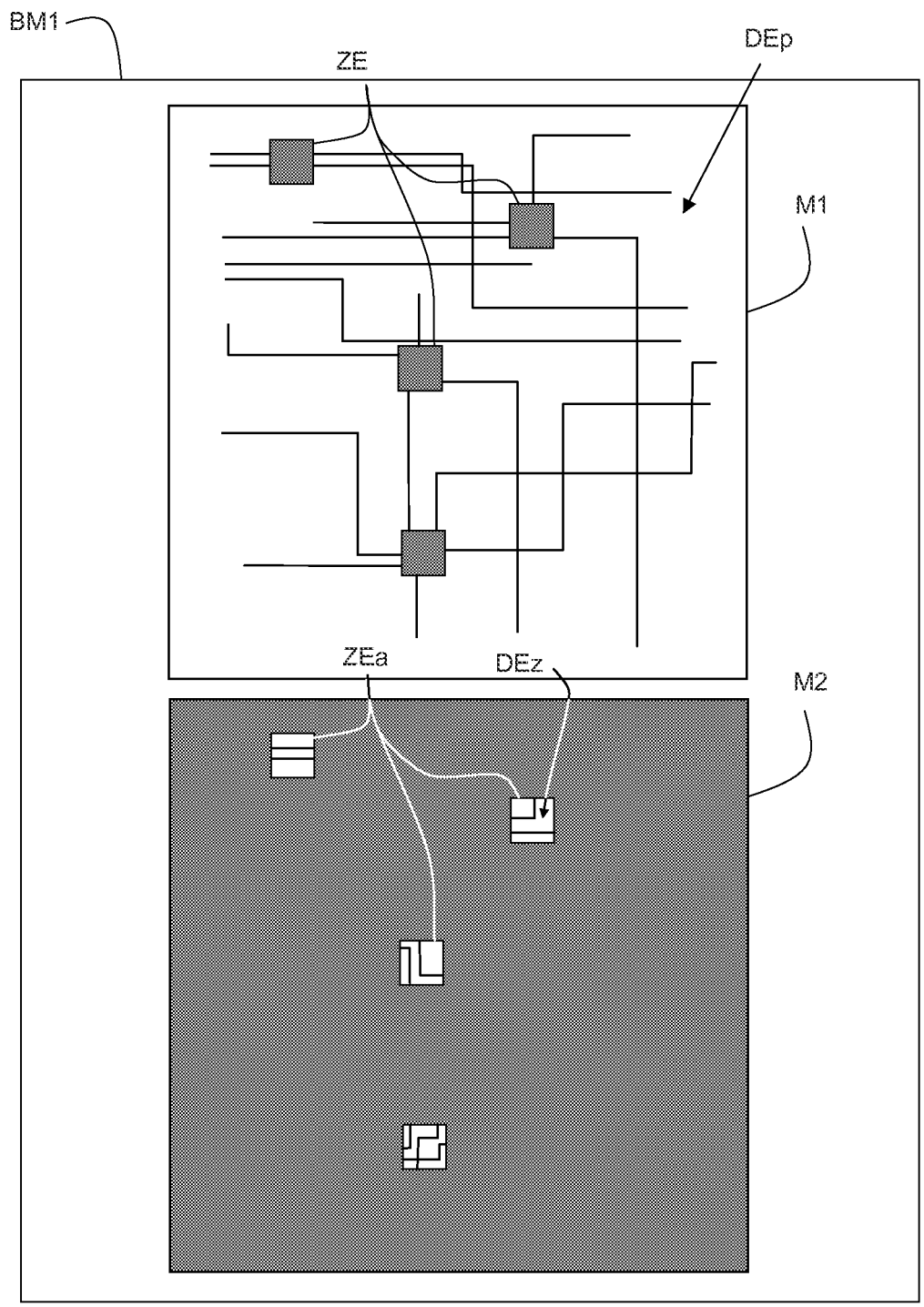
FIG. 8 represents an implementation of the method with just one mask blank on which are formed a first mask design and a second mask design complementing the first.

This case is represented in FIG. 8. The mask blank BM1 comprises two mask designs M1 and M2 which are complementary and whose relative positions are perfectly defined for it then to be possible to superimpose the projections of these designs during the two photolithography steps; the exclusion zones ZE of the first design M1 are situated in the same relative positions as the associated zones of the second design M2; during the photolithographic projection, they are then superimposed exactly on the associated zones ZEa of the second design, which contains missing design patterns of the mask M1.

It is preferably essential to check that the mask blank BM1 does not include defects in the associated zones ZEa, but statistically, this is improbable.

In the photolithography with the single mask M1+M2 formed from the mask blank BM1, separate use is made of the first mask design M1 to project the design DEp onto the surface to be exposed, and of the second mask design M2, offset in the photolithography machine to place it in position to project the complementary design DEz by exactly superimposing the exclusion zones ZE and the associated zones ZEa on the surface. The order of the steps is immaterial.

For even smaller design patterns, it is possible to have several pairs of complementary designs M1, M2 on the single mask blank. The pairs can be identical to on another (for a multiple exposure of a plurality of chips) or different from one another if they correspond to different photolithography steps or to different patterns to be exposed simultaneously.

The advantage of the formation of the two designs M1 and M2 on the same mask blank is the greatest alignment accuracy that is possible in the projection, without the need for recourse to a successive alignment of two masks or to a secure attachment of the two masks.

The invention claimed is:

1. A photolithography method for a photolithography operation on a surface to be exposed according to a desired design pattern, the photolithography method comprising:
  producing a first mask blank having defects;
  establishing an individual mapping of positions of the defects of the first mask blank using an inspection machine;
  defining an exclusion zone around each defect;
  patterning the first mask blank to form a first mask according to a first mask design comprising a desired design pattern except in the exclusion zones, the exclusion zones being black;
  producing a second mask blank;
  patterning the second mask blank to form a second mask according to a second mask design comprising a complementary design pattern comprising, in zones associated with and having a same position as the exclusion zones of the first mask, portions of the desired design pattern, the rest of the second mask design being black; and
  performing a fist photolithography step on the surface to be exposed using the first mask and a second photolithography step using the second mask by superposing, on the surface to be exposed, the exclusion zones of the first mask design and the associated zones of the second mask design,
  wherein the first and second masks are securely simultaneously attached to one and the same support such that the first and second masks can be used successively to perform said first and second photolithography steps.

2. The photolithography method according to claim 1, further comprising establishing a mapping of defects of the second mask blank, and checking to ensure that the defects of the second mask blank are not located in an exclusion zone of the first mask blank.

3. The photolithography method according to claim 1, wherein the first and the second mask designs are produced respectively from a first design file and from a second design file, the two files being established from one and the same file containing the desired design pattern and from the position of each of the defects observed on the first mask blank.

4. The photolithography method according to claim 3, wherein the first and the second files are established by taking into account design rules, including a rule for choosing exclusion zone dimensions as a function of the size of the observed defect.

5. The photolithography method according to claim 4, wherein the first and the second files are established with a rule dictating that the limits of an exclusion zone do not intersect an active zone comprising the source, the gate or the drain of a transistor.

6. The photolithography method according to claim 3, wherein the first and the second files are established by taking into account design rules linked to the actual design to be produced.

7. The photolithography method according to claim 1, wherein the mask designs comprise optical proximity correction patterns, including correction patterns on the limits of the exclusion zones and associated zones.

8. A photolithography method for a photolithography operation on a surface to be exposed according to a desired design pattern, the photolithography method comprising:
producing a mask blank having defects;
establishing an individual mapping of positions of the defects of the mask blank using an inspection machine;
defining an exclusion zone around each defect;
patterning a first region of the mask blank to form a mask according to a first mask design comprising a desired design pattern except in the exclusion zones, the exclusion zones being black;
patterning a second region of the mask blank according to a second mask design comprising a complementary design pattern comprising, in zones associated with the exclusion zones, portions of the desired design pattern, the rest of the second mask design being black; and
performing a fist photolithography step on the surface to be exposed using the first region of the first mask and a second photolithography step using the second region of the mask by superposing, on the surface to be exposed, the exclusion zones of the first design and the associated zones of the second design,
wherein the first and second regions of the mask blank are juxtaposed, and the mask blank is offset laterally between the two photolithography steps to superpose, on the surface to be exposed, the exclusion zones of the first mask design and the associated zones of the second mask design.

9. The photolithography method according to claim 8, wherein the first and the second mask designs are produced respectively from a first design file and from a second design file, the two files being established from one and the same file containing the desired design pattern and from the position of each of the defects observed on the first mask blank.

10. The method according to claim 9, further comprising establishing a mapping of defects of the second mask blank, and checking to ensure that the defects of the second mask blank are not located in an exclusion zone of the first mask blank.

11. The method according to claim 9, wherein the first and the second files are established by taking into account design rules, including a rule for choosing exclusion zone dimensions as a function of the size of the observed defect.

12. The method according to claim 11 wherein the first and the second files are established with a rule dictating that the limits of an exclusion zone do not intersect an active zone comprising the source, the gate or the drain of a transistor.

13. The method according to claim 9, wherein the first and the second files are established by taking into account design rules linked to the actual design to be produced.

14. The photolithography method according to claim 8, wherein the mask designs comprise optical proximity correction patterns, including correction patterns on the limits of the exclusion zones and associated zones.

15. A photolithography method for a photolithography operation on a surface to be exposed according to a desired design pattern, the photolithography method comprising:
producing at least a first mask blank having defects;
establishing an individual mapping of positions of the defects of the first mask blank using an inspection machine;
defining an exclusion zone around each defect;
patterning at least a first region of the first mask blank to form a first mask according to a first mask design comprising a desired design pattern except in the exclusion zones, the exclusion zones being left black;
patterning either a second region of the first mask blank or a second mask blank according to a second mask design comprising a complementary design pattern comprising, in zones associated with the exclusion zones, portions of the desired design pattern, the rest of the second mask design being black; and
performing a fist photolithography step on the surface to be exposed using the first region of the first mask and a second photolithography step using the second region of the first mask or the second mask by superposing, on the surface to be exposed, the exclusion zones of the first mask design and the associated zones of the second mask design,
wherein the mask designs comprise optical proximity correction patterns, including correction patterns on the limits of the exclusion zones and associated zones.

16. The method according to claim 15, wherein the first and the second mask designs are produced respectively from a first design file and from a second design file, the two files being established from one and the same file containing the desired design pattern and from the position of each of the defects observed on the first mask blank.

17. The method according to claim 16, wherein the first and the second files are established by taking into account design rules, including a rule for choosing exclusion zone dimensions as a function of the size of the observed defect.

18. The method according to claim 17 wherein the first and the second files are established with a rule dictating that the limits of an exclusion zone do not intersect an active zone comprising the source, the gate or the drain of a transistor.

19. The method according to claim 16, wherein the first and the second files are established by taking into account design rules linked to the actual design to be produced.

* * * * *